US00RE46253E

(19) United States
(12) Reissued Patent
Costanza-Steady

(10) Patent Number: US RE46,253 E
(45) Date of Reissued Patent: Dec. 27, 2016

(54) ADJUSTABLE VEHICLE CARRIER FOR A ROLLATOR

(71) Applicant: Steady Enterprises, LLC, Madison, TN (US)

(72) Inventor: Sherry Costanza-Steady, Madison, TN (US)

(73) Assignee: Steady Enterprises, LLC, Madison, TN (US)

(21) Appl. No.: 14/860,831

(22) Filed: Sep. 22, 2015

Related U.S. Patent Documents

Reissue of:
(64) Patent No.: 8,596,508
Issued: Dec. 3, 2013
Appl. No.: 13/891,507
Filed: May 10, 2013

U.S. Applications:
(60) Provisional application No. 61/688,229, filed on May 10, 2012.

(51) Int. Cl.
*B60R 9/06* (2006.01)
*B60R 9/042* (2006.01)

(52) U.S. Cl.
CPC ..... *B60R 9/06* (2013.01); *B60R 9/0426* (2013.01)

(58) Field of Classification Search
CPC ..... B60R 9/06; B60R 9/10
USPC ..... 224/444, 497, 502, 509, 533, 536
See application file for complete search history.

(56) References Cited

U.S. PATENT DOCUMENTS 3,796,333 A * 3/1974 Goldstein ..... 414/462
4,124,080 A * 11/1978 McCanse ..... 172/445.2
4,593,840 A * 6/1986 Chown ..... 224/520
4,744,590 A * 5/1988 Chesney ..... 280/769
5,094,373 A * 3/1992 Lovci ..... 224/509
5,096,102 A * 3/1992 Tolson ..... 224/513
5,129,559 A 7/1992 Holliday
5,169,042 A * 12/1992 Ching ..... B60R 9/06 224/497
5,190,195 A * 3/1993 Fullhart et al. ..... 224/497
5,303,857 A * 4/1994 Hewson ..... 224/506
5,330,084 A * 7/1994 Peters ..... 224/506
5,449,101 A * 9/1995 Van Dusen ..... 224/506
5,454,496 A * 10/1995 Sumida et al. ..... 224/509
5,518,156 A * 5/1996 Lehman ..... B60N 3/16 224/281
5,518,159 A * 5/1996 DeGuevara ..... 224/488
5,544,799 A * 8/1996 Didlake ..... 224/502
5,664,717 A * 9/1997 Joder ..... 224/502
5,752,799 A * 5/1998 Carey et al. ..... 414/543
5,775,560 A * 7/1998 Zahn et al. ..... 224/524
5,810,542 A * 9/1998 Ostrander ..... 414/462
(Continued)

FOREIGN PATENT DOCUMENTS

FR 08901084 1/1989

*Primary Examiner* — Russell D Stormer
(74) *Attorney, Agent, or Firm* — Garrett M. Hausman; Patterson Intellectual Property Law, P.C.

(57) ABSTRACT

A rollator carrier is operable to quickly support and secure a rollator. The carrier includes a pair of cradles to support the rollator, and an arm that rotates between a horizontal and vertical position. With the arm down, a user can easily lift the rollator into the relatively low cradles. The user can then rotate the arm up to the vertical position and secure the rollator to the carrier with a clamp of the carrier extending from the top end of the arm.

19 Claims, 7 Drawing Sheets

(56) References Cited

U.S. PATENT DOCUMENTS

| | | | | | |
|---|---|---|---|---|---|
| 5,857,824 | A * | 1/1999 | De Aquiar | B60P 3/07 | 224/503 |
| 5,996,870 | A * | 12/1999 | Shaver | 224/532 | |
| 6,007,289 | A * | 12/1999 | Kruse | A61G 3/0209 | 414/462 |
| 6,019,266 | A | 2/2000 | Johnson | | |
| 6,164,508 | A * | 12/2000 | van Veenen | 224/509 | |
| 6,345,749 | B1 * | 2/2002 | Hamilton | B60R 9/06 | 224/282 |
| 6,386,410 | B1 * | 5/2002 | Van Dusen et al. | 224/509 | |
| 6,491,195 | B1 | 12/2002 | McLemore et al. | | |
| 6,516,986 | B1 * | 2/2003 | Lassanske et al. | 224/533 | |
| 6,695,184 | B2 | 2/2004 | Higginbotham, III | | |
| 6,857,839 | B2 * | 2/2005 | Pitoniak | 414/462 | |
| 7,240,816 | B2 | 7/2007 | Tsai | | |
| 7,261,229 | B1 * | 8/2007 | Allen et al. | 224/503 | |
| 7,419,076 | B1 * | 9/2008 | Grothues | 224/519 | |
| 7,591,404 | B2 * | 9/2009 | LeDuc et al. | 224/509 | |
| 7,811,045 | B2 * | 10/2010 | Butta | 414/462 | |
| 8,235,267 | B2 | 8/2012 | Sautter et al. | | |
| 8,726,552 | B2 * | 5/2014 | Larsen | G09F 21/04 | 224/509 |
| 2004/0238582 | A1 * | 12/2004 | Pedrini | 224/519 | |
| 2007/0000962 | A1 * | 1/2007 | Reeves | B60R 9/10 | 224/536 |
| 2008/0296330 | A1 * | 12/2008 | Kalous et al. | 224/519 | |

* cited by examiner

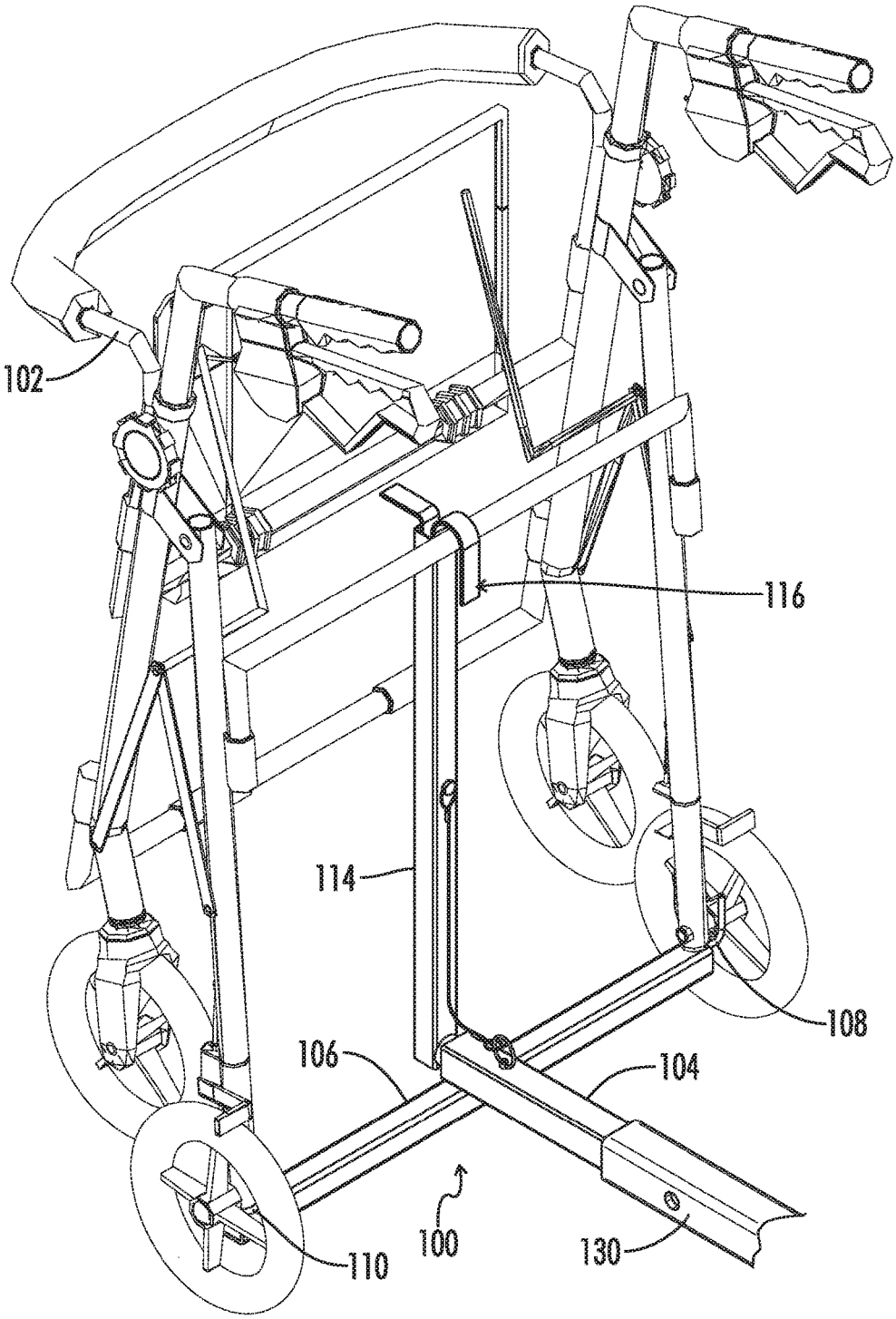
*FIG. 4*
(AMENDED)

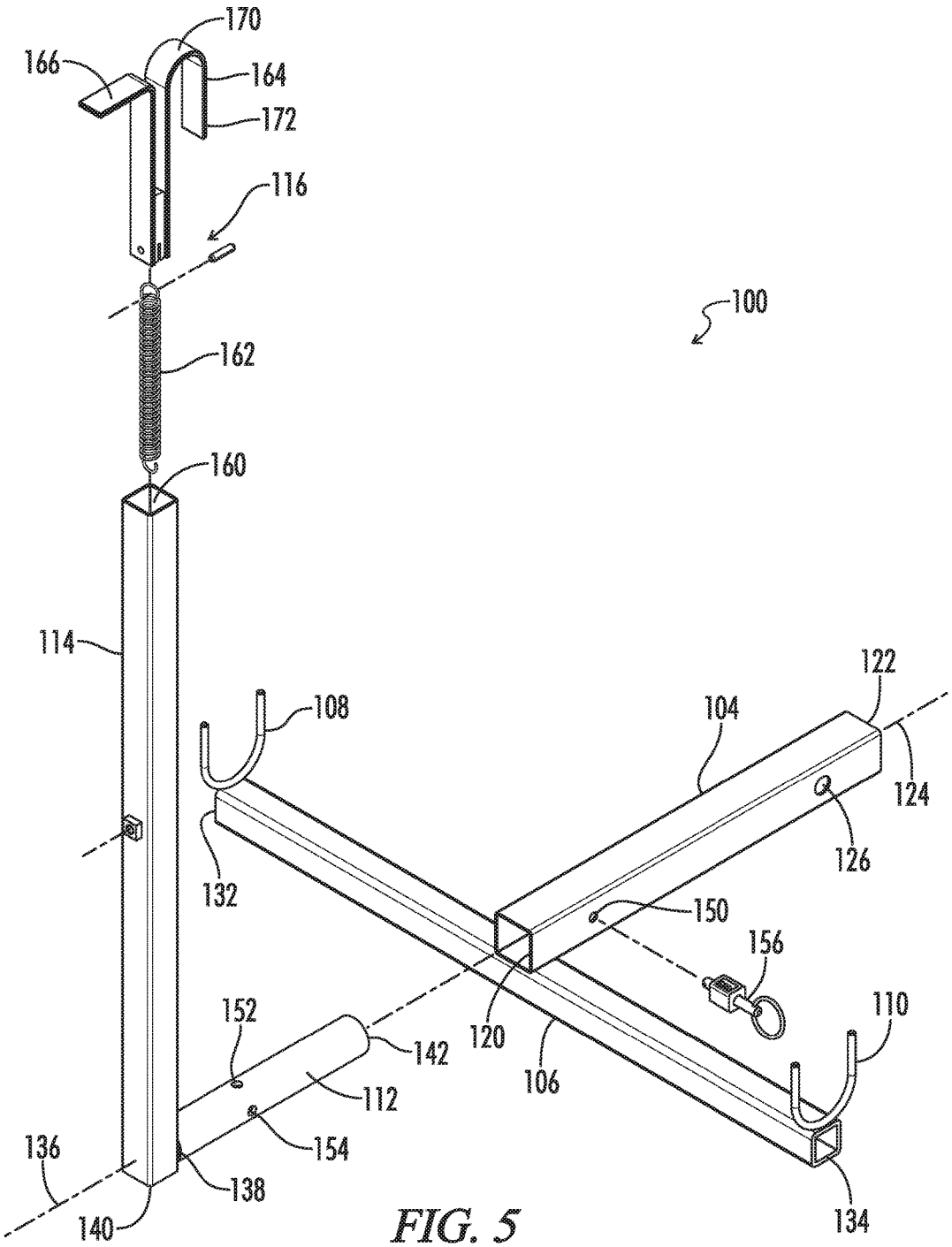
FIG. 5
(NEW)

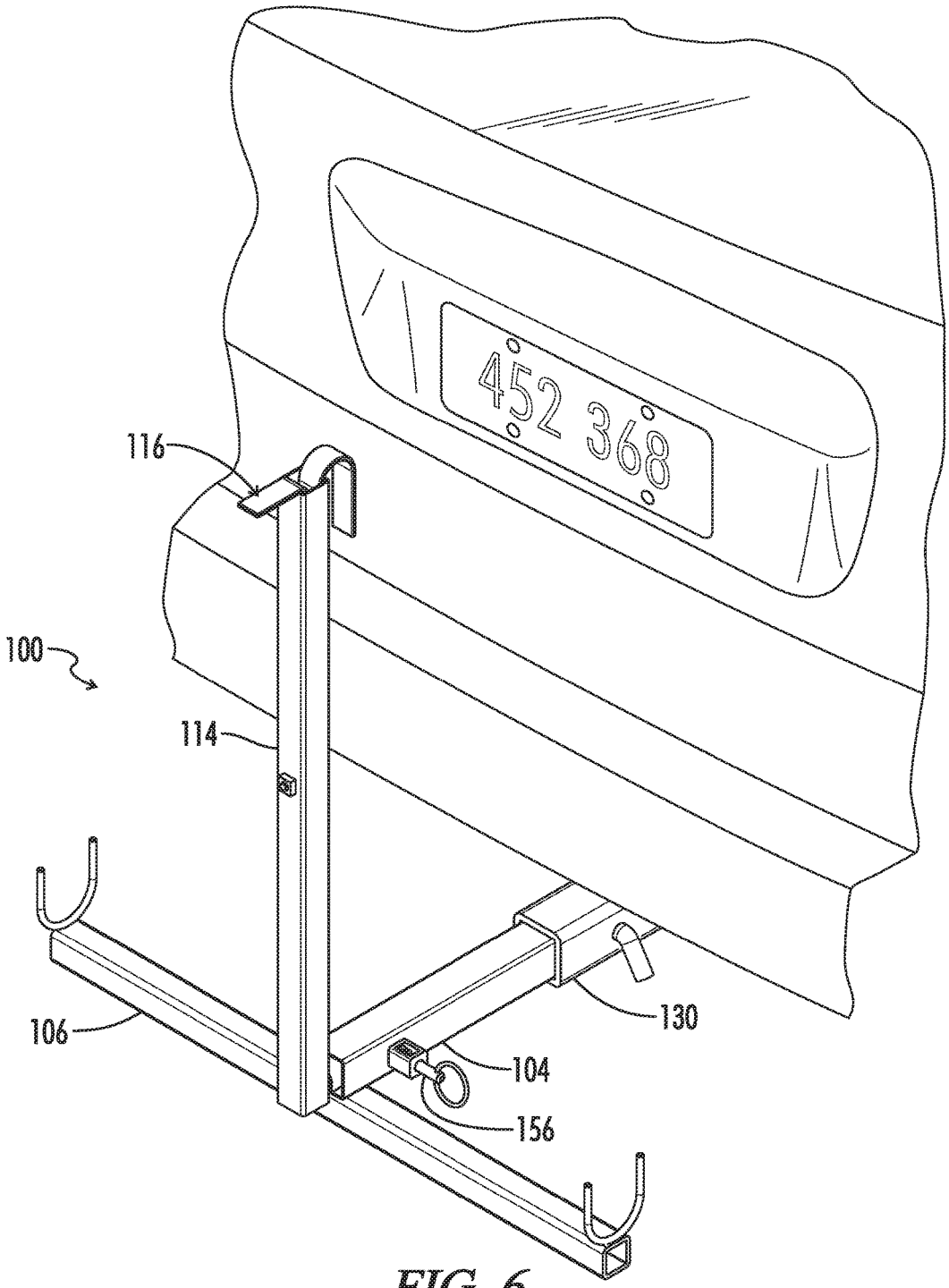
*FIG. 6*
(NEW)

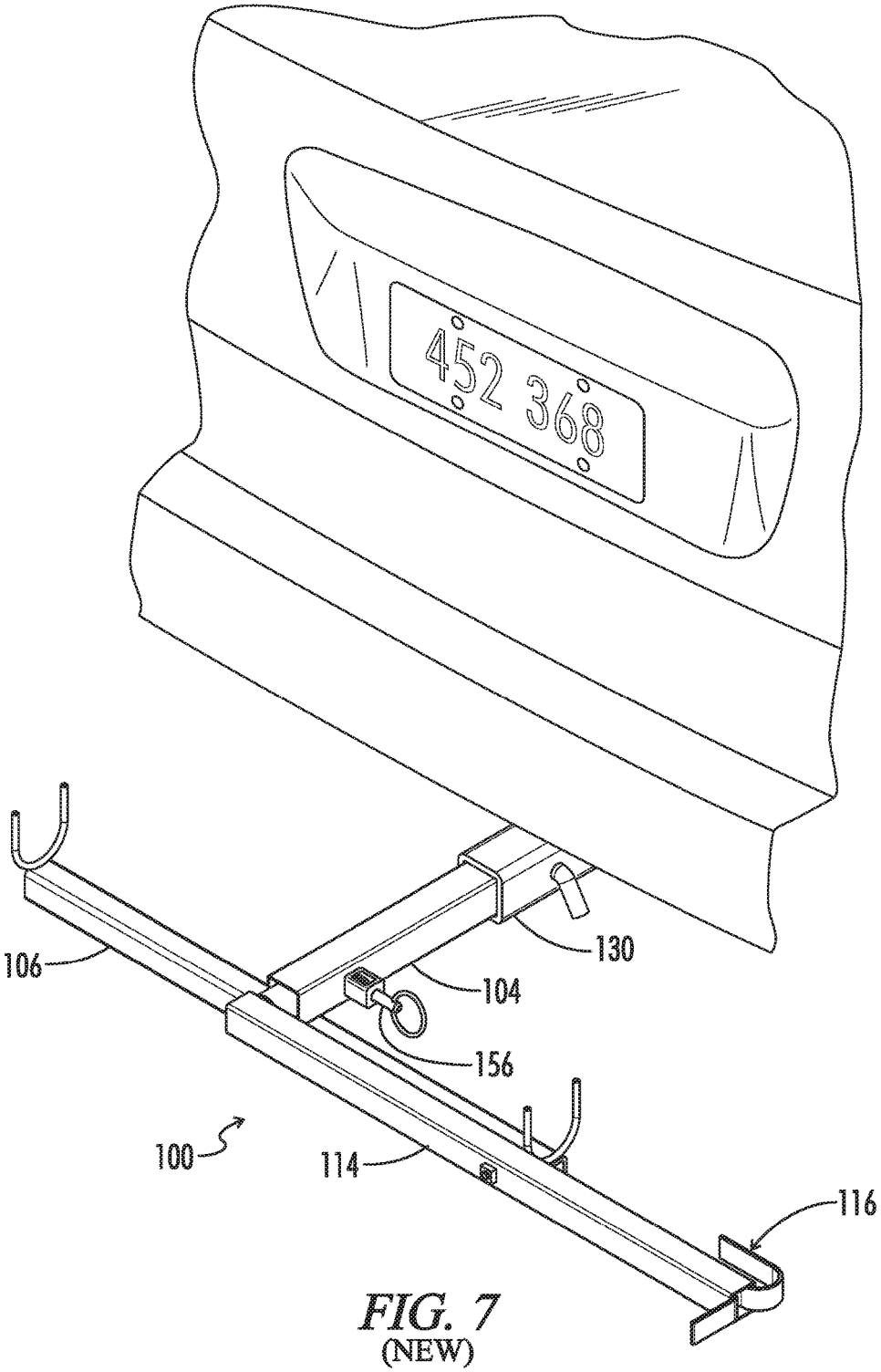
*FIG. 7*
(NEW)

ADJUSTABLE VEHICLE CARRIER FOR A ROLLATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

This application claims priority to and benefit of U.S. Provisional Patent Application Ser. No. 61/688,229 filed May 10, 2012, entitled "Steady's Rollator Carrier" which is incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to carriers for rollators. More particularly, this invention pertains to foldable vehicle receiver hitch mounted rollator carriers.

Rollators are used by people to enhance mobility. Generally, users of rollators are elderly individuals who are substantially independent and able to safely drive a vehicle. It is difficult for these users to lift their rollator several feet high to place the rollator in the trunk of a car. A user may strap a rollator to a platform or basket style cargo area mounted in a vehicle's receiver hitch, but it is difficult and time consuming to secure the rollator to the cargo area[. With]*with* separate straps and ropes.

BRIEF SUMMARY OF THE INVENTION

Aspects of the present invention provide a rollator carrier that is operable to quickly support and secure a rollator. The carrier includes a pair of cradles to support the rollator[.]and an arm that rotates between a horizontal and vertical position. With the arm down, a user can easily lift the rollator into the relatively low cradles. The user can then rotate the arm up to the vertical position and secure the rollator to the carrier with a clamp of the carrier extending from the top end of the arm.

In one aspect, a carrier is operable to support and secure a rollator for transportation of the rollator. The carrier includes a first tube section, a second tube section, a first cradle, a second cradle, a third tube section, a fourth tube section, and a clamp. The first tube section has a first end and a second end opposite the first end. The second end is operable to engage a mount. The first tube section has a longitudinal axis extending along the first tube section from the first end to the second end. The second tube section is affixed to the first tube section adjacent the first end of the first tube section. The first tube section is substantially centered with respect to the second tube section, and the second tube section has a first end and a second end opposite the first end. The second tube section is substantially horizontal when the carrier is in an upright position. The first cradle is affixed to the second tube section at the first end of the second tube section or adjacent to the first end of the second tube section. The second cradle is affixed to the second tube section at the second end of the second tube section or adjacent to the second end of the second tube section, and the second cradle is operable to support the rollator in cooperation with the first cradle. The third tube section is operable to engage the [second] *first* end of the first tube section, and the third tube section is operable to rotate about the longitudinal axis of the first tube section. The fourth tube section is affixed to the third tube section and is operable to extend substantially perpendicularly from the third tube section. The fourth tube section is affixed to the third tube section at or adjacent to a first end of the third tube section and a point adjacent to a first end of the fourth tube section. The clamp extends from the fourth tube section and is operable to secure the rollator to the carrier by engaging the [relator] *rollator* and preventing the rollator from bouncing out of the first cradle and the second cradle while the rollator is being transported on the carrier. The third tube section is rounded adjacent to a second end of the third tube section opposite the first end of the third tube section. The third tube section is operable to fit within or over a portion of the first tube section such that a longitudinal axis of the third tube section is collinear with the longitudinal axis of the first tube section. The first tube section has an alignment hole adjacent the first end of the first tube section. The third tube section has a first hole operable to align with the alignment hole in the first tube section when the fourth tube [sections] *section is* substantially parallel to the second tube section. The third tube section has a second hole operable to align with the alignment hole in the first tube section when the fourth tube [sections] *section is* substantially vertical and the carrier is in a substantially upright position.

In another aspect, a carrier is operable to support and secure a rollator for transportation of the rollator. The carrier includes a first tube section, a second tube section, a first cradle, a second cradle, a third tube section, a fourth tube section, and a clamp. The first tube section has a first end and a second end opposite the first end. The second end is operable to engage [amount] *a mount*. The first tube section has a longitudinal axis extending along the first tube section from the first end to the second end. The second tube section is affixed to the first tube section adjacent the first end of the first tube section. The first tube section is substantially centered with respect to the second tube section, and the second tube section has a first end and a second end opposite the first end. The second tube section is substantially horizontal when the carrier is in an upright position. The first cradle is affixed to the second tube section at the first end of the second tube section or adjacent to the first end of the second tube section. The second cradle is affixed to the second tube section at the second end of the second tube section or adjacent to the second end of the second tube section, and the second [cradles] *cradle is* operable to support the rollator in cooperation with the first cradle. The third tube section is operable to engage the [second] *first* end of the first tube section, and the third tube section is operable to rotate about the longitudinal axis of the first tube section.

The fourth tube section is affixed to the third tube section and is operable to extend substantially perpendicularly from the third tube section. The fourth tube section is affixed to the third tube section at or adjacent to a first end of the third tube section and a point adjacent to a first end of the fourth tube section. The clamp extends from the fourth tube section and is operable to secure the rollator to the carrier by engaging the [relator] *rollator* and preventing the rollator from bouncing out of *the* first cradle and the second cradle while the [relator] *rollator* is being transported on the carrier. The clamp includes a spring, a hook, and a handle. The [book] *hook* has a first portion extending generally perpendicularly from the fourth tube section and a second portion extending generally parallel to the fourth tube section toward the first end of the fourth tube section. The spring is connected to the hook and connected to the fourth tube section, and the spring biases the hook into the second end of the fourth tube section. The handle extends generally perpendicularly from the fourth tube section in a direction generally opposite the first portion of the hook.

In another aspect, a carrier is operable to support and secure a rollator for transportation of the rollator. The carrier includes a first tube section, a second tube section, a first cradle, a second cradle, a third tube section, a fourth tube section, and a clamp. The first tube section has a first end and a second end opposite the first end. The second end is operable to engage [amount] *a mount*. The first tube section has a longitudinal axis extending along the first tube section from the first end to the second end. The second tube section is affixed to the first tube section adjacent the first end of the first tube section. The first tube section is substantially centered with respect to the second tube section, and the second tube section has a first end and a second end opposite the first end. The second tube section is substantially horizontal when the carrier is in an upright position. The first cradle is affixed to the second tube section at the first end of the second tube section or adjacent to the first end of the second tube section. The second cradle is affixed to the second tube section at the second end of the second tube section or adjacent to the second end of the second tube section, and the second [cradles] *cradle is* operable to support the rollator in cooperation with the first cradle. The third tube section is operable to engage the [second] *first* end of the first tube section, and the third tube section is operable to rotate about the longitudinal axis of the first tube section. The fourth tube section is affixed to the third tube section and is operable to extend substantially perpendicularly from the third tube section. The fourth tube section is affixed to the third tube section at or adjacent to a first end of the third tube section and a point adjacent to a first end of the fourth tube section. The clamp extends from the fourth tube section and is operable to secure the rollator to the carrier by engaging the [relator]*rollator* and preventing the rollator from bouncing out of first cradle and the second cradle while the relator is being transported on the carrier. The clamp includes a spring, a hook, and a handle. The [book]*hook* has a first portion extending generally perpendicularly from the fourth tube section and a second portion extending generally parallel to the fourth tube section toward the first end of the fourth tube section. The spring is connected to the hook and connected to the fourth tube section, and the spring biases the hook into the second end of the fourth tube section. The handle extends generally perpendicularly from the fourth tube section in a direction generally opposite the first portion of the hook. The third tube section is rounded adjacent to a second end of the third tube section opposite the first end of the third tube section. The third tube section is operable to fit within or over a portion of the first tube section such that a longitudinal axis of the third tube section is collinear with the longitudinal axis of the first tube section. The first tube section has an alignment hole adjacent the first end of the first tube section. The third tube section has a first hole operable to align with the alignment hole in the first tube section when the fourth tube [sections] *section is* substantially parallel to the second tube section. The third tube section has a second hole operable to align with the alignment hole in the first tube section when the fourth tube [sections] *section is* substantially vertical and the carrier is in a substantially upright position.

BRIEF DESCRIPTION OF THE SEVERAL VIEWS OF THE DRAWINGS

FIG. 4 is a perspective view of a carrier for a rollator mounted to a vehicle receiver hitch with a rollator supported and secured for transportation thereon.

*FIG. 5 is an exploded isometric view of an alternative embodiment of a carrier for a rollator.*

*FIG. 6 is a perspective view of the carrier of FIG. 5 mounted to a vehicle receiver hitch with an arm of the rollator in an up or vertical position.*

*FIG. 7 is a perspective view of the carrier of FIG. 5 mounted to a vehicle receiver hitch with an arm of the rollator in a down or horizontal position.*

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
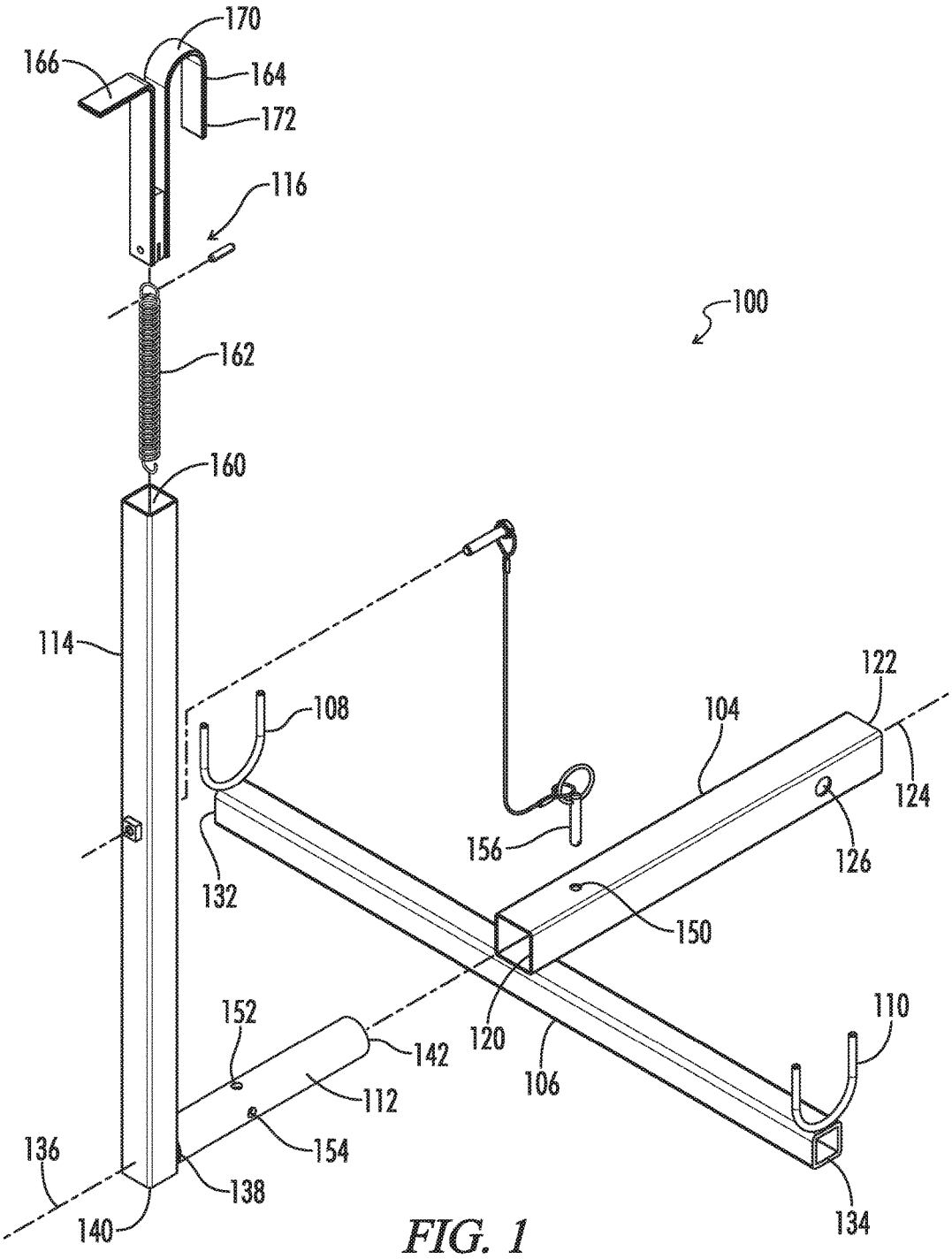
FIG. 1 is an exploded isometric view of a carrier for a rollator.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Referring to FIGS. 1-4, a carrier 100 is operable to support and secure a rollator 102 for transportation. The carrier 100 includes a first tube section 104, a second tube section 106, a first cradle 108, a second cradle 110, a third tube section 112, a fourth tube section 114, and a clamp 116. The first tube section 104 has a first end 120 and a second end 122 opposite the first end 120. The second end 122 of the first tube section 104 is operable to engage a mount 130. In one embodiment, the [amount] *mount* 130 is a receiver hitch of a vehicle. The first tube section has a longitudinal axis 124 extending along the first tube section 104 from the first end 120 to the second end 122. In one embodiment, the first tube section 104 is formed from square metal tubing and has a hitch pin hole 126 adjacent the second end 122 of the first tube section 104. The hinge pin hole 126 is operable to receive a hitch pin when mounting the carrier 100 to a mount 130 (e.g., receiver hitch).

The second tube section 106 is affixed (e.g., welded) to the first tube section 104. The first tube section 104 is substantially centered with respect to the second tube section 106, and the second tube section 106 has a first end 132 and a second end 134 opposite the first end 132. The second tube section 106 is substantially horizontal when the carrier 100 is in an upright position (e.g., mounted in a vehicle's receiver hitch). The first cradle 108 is affixed to the second tube section 106 at the first end 132 of the second tube section [1064] *106* or at a point adjacent to the first end 132 of the second tube section 106. The second cradle 110 is affixed to the second tube section 106 at the second end 134 of the second tube section 106 or at a point adjacent to the second end 134 of the second tube section 106. The second cradle 110 is operable to support the rollator for transportation on the carrier 100 in cooperation with the first cradle 108. In one embodiment, the first cradle 108 and the second cradle 110 each comprise a pair of protrusions extending generally upwardly from the second tube section 106 when the second tube section 106 is in an upright position for receiving the rollator 102. In one embodiment, the second tube section 106 is split into two portions. A first portion is welded to the first tube section 104 on a first lateral side of the first tube section 104, and a second portion of the second tube section 106 is welded to a second lateral side of the first tube section 104 opposite the first lateral side of the first tube section 104.

The third tube section 112 is operable to engage the [second]*first* end 120 of the first tube section 104. The third tube section 112 is operable to rotate about the longitudinal axis 124 of the first tube section 104. In one embodiment, the third tube section 112 is rounded adjacent a second end 142 of the third tube section 112 opposite the first end 138 of the third tube section 112. The third tube section 112 is operable to fit within or over a portion of the first tube section 104 adjacent the first end 120 of the first tube section 104 such that the longitudinal axis 136 of the third tube section 112 substantially co-linear with the longitudinal axis 124 of the first tube section 104.

In one embodiment, the first tube section 104 has an alignment hole 150 adjacent the first end 120 of the first tube section 104. The third tube section 112 has a first hole 154 operable to align with the alignment hole 150 in the first tube section 104 when the fourth tube section 114 is substantially parallel to the second tube section 106. An alignment [pen]*pin* 156 is operable to engage the alignment hole 150 and the first hole 154 of the third tube section 112 to maintain the fourth tube section 114 [and]*in* a position substantially parallel to the second tube section 106. The third tube section 112 also has a second hole 152 operable to align with the alignment hole 150 in the first tube section 104 when the fourth tube section 114 is substantially vertical and the carrier 100 is in a substantially upright position (e.g. [managed] *mounted* to a vehicle's receiver hitch). The alignment [pen]*pin* 156 is further operable to engage the alignment hole 150 and the second hole 152 of the third tube section 112 to hold or maintain the fourth tube section 114 in the substantially vertical position. In one embodiment, the alignment hole 150 is in a top surface of the first tube section 104, and the alignment [pen]*pin* 156 is tethered to the carrier 100 at, for example, the fourth tubing section 114. In another embodiment, the alignment [pen]*pin* 156 is a spring-loaded pin *affixed to a lateral side of the first tube section 104*, and the alignment hole 150 is on a lateral surface of the first tube section [104]. *In such an embodiment, the alignment pin 156 is operable to engage the alignment hole 150 and the first hole 154 of the third tube section 112 to maintain the fourth tube section 114 in the substantially upright position and to engage the alignment hole and the second hold 152 of the third tube section to maintain the fourth tube section in a position substantially parallel to the second tube section 106.* The lateral surface (*or lateral side*) of the first tube section 104 is a vertical portion of the first tube section 104 when the carrier 100 is in an upright position.

The fourth tube section 114 is affixed to the third tube section 112 (e.g., welded) and extends substantially perpendicularly from the third tube section 112. The fourth tube section 114 is affixed to the third tube section 112 at a first end 138 of the third tube section 112 or at a point adjacent to the first end 138 of the third tube section 112 [at or ] *and* at a point adjacent to a first end 140 of the fourth tube section 114.

The clamp 116 extends from the fourth tube section 114. The clamp 116 is operable to secure the rollator 102 to the carrier 100 by engaging the rollator 102 and preventing the rollator 102 from bouncing out of the first cradle 108 and the second cradle 110 while the rollator 102 is being transported on the carrier 100. In one embodiment, the clamp 116 extends from a second end 160 of the fourth tube section 114 opposite the first end 140 of the fourth tube section 114. The clamp 116 includes a spring 162, a hook 164, and a handle 166. The spring 162 is connected to the clamp 116 and anchored to the fourth tube section 114 to bias the clamp 116 into the second end 160 of the fourth tube section 114. The hook 164 has a first portion 170 extending generally perpendicularly from the fourth tube section 114 and a second portion 172 extending generally parallel to the fourth tube section 114 toward the first end 140 of the fourth tube section 114. A handle 166 extends generally perpendicularly from the fourth tube section 114 in a direction generally opposite the first portion 170 of the hook 164.

Figure 2:
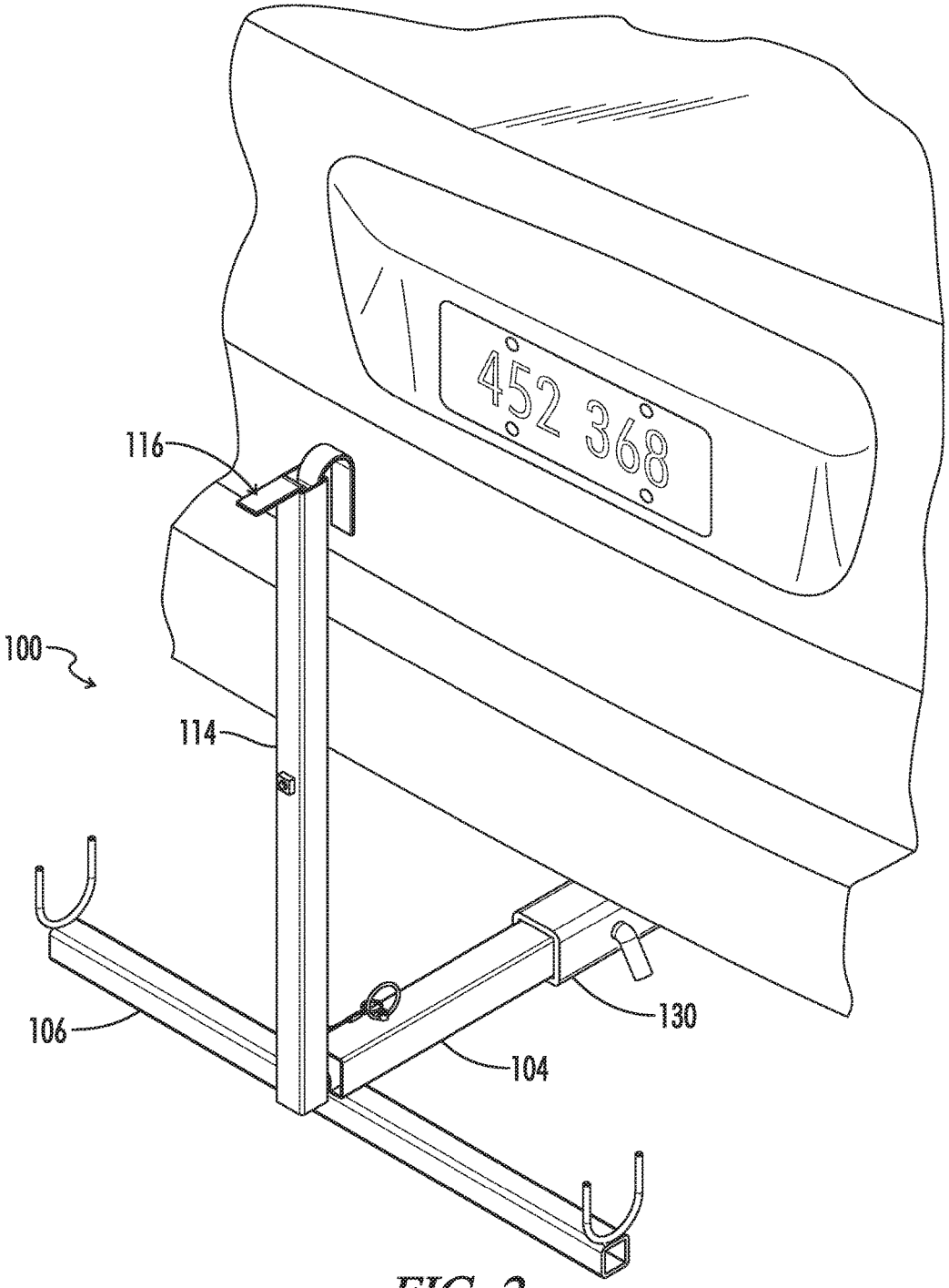
FIG. 2 is a perspective view of a carrier for a rollator mounted to a vehicle receiver hitch with an arm of the rollator in an up or vertical position.
Figure 3:
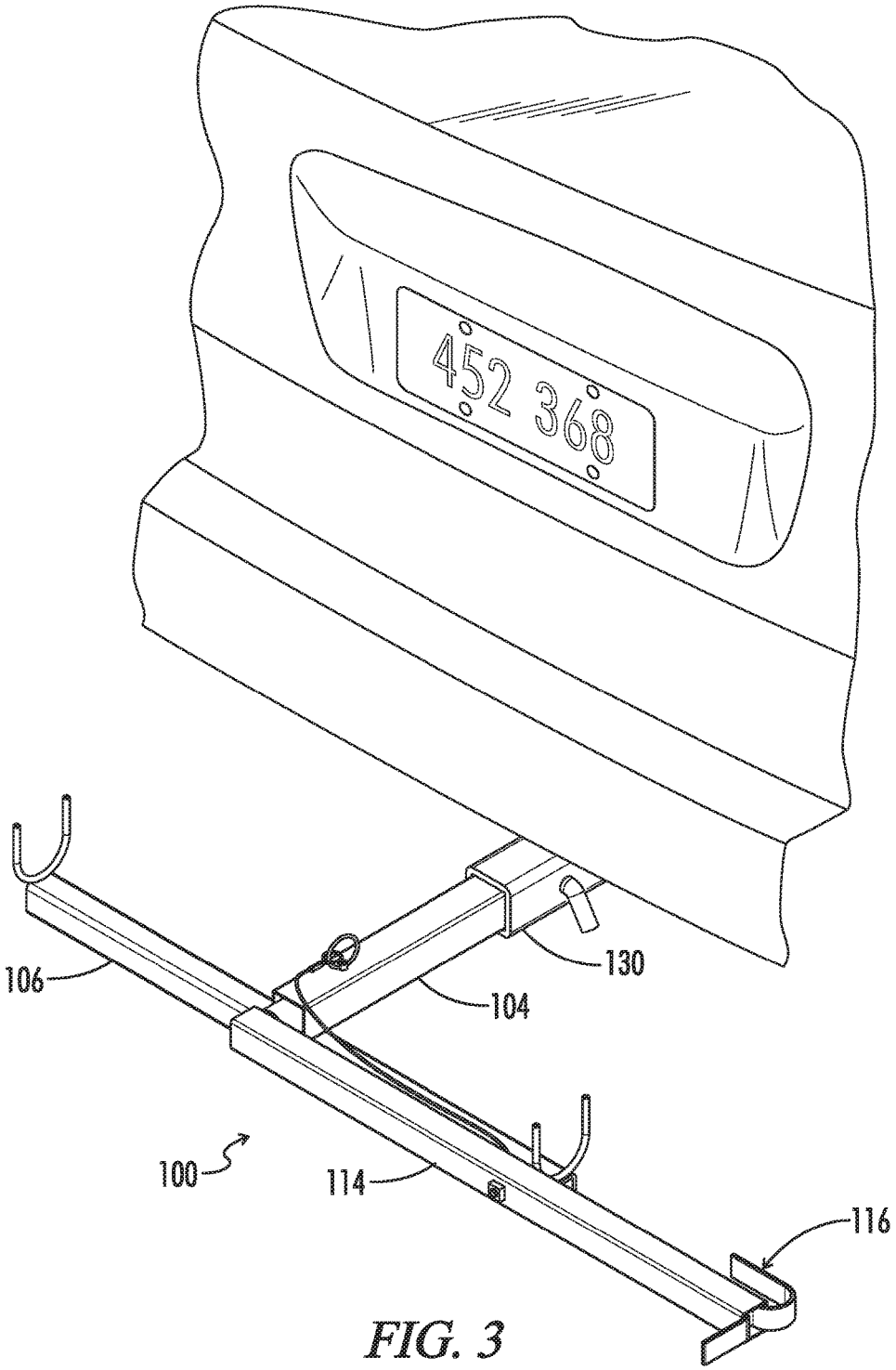
FIG. 3 is a perspective view of a carrier for a rollator mounted to a vehicle receiver hitch with an arm of the rollator in a down or horizontal position.

Referring to FIG. 2, the carrier 100 is shown mounted in a receiver hitch of a vehicle. Referring to FIG. 3, the carrier is shown with an arm of the carrier (i.e., the fourth [tubing]*tube* section 114 and parts attached thereto) in a down or horizontal position. The rollator 102 can then be placed in the first carrier 108 and second carrier 110 to support the rollator 102 on the carrier 100. The arm is rotated into a vertical position and secured via the alignment hole 150 as described above. The handle 166 is then used to pull the clamp 116 out of the second end 160 of the fourth tubing section 114 and secure the hook 164 of the clamp 116 on to the rollator 102 holding the rollator 102 into the first cradle 108 and second cradle 110 for transportation as shown in FIG. 4. Alternatively, the hook 164 of the clamp 116 may extend away from the second end 122 of the first [tubing]*tube* section 104. In this embodiment, the user would position the rollator 102 in the first cradle 108 and second cradle 110, push the rollator against the fourth

[tubing]*tube* section 114 and hook 164, and then use the handle 166 of the clamp 116 to secure the hook 164 onto the rollator 102.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful ADJUSTABLE VEHICLE CARRIER FOR A ROLLATOR it is not intended that such references be construed as limitations upon the scope of this invention except as set forth in the following claims.

What is claimed is:

1. A carrier operable to support and secure a rollator for transportation, said carrier comprising:

a first tube section having a first end and a second end opposite the first end, wherein the second end is operable to engage a mount, wherein the first tube section has a longitudinal axis extending along the first tube section from the first end to the second end;

a second tube section affixed to the first tube section adjacent the first end of the first tube section, wherein the first tube section is substantially centered with respect to the second tube section and the second tube section has a first end and a second end opposite the first end, wherein the second tube section is substantially horizontal when the carrier is in a substantially upright position;

a first cradle affixed to the second tube section at the first end of the second tube section or adjacent to the first end of the second tube section;

a second cradle affixed to the second tube section at the second end of the second tube section or adjacent to the second end of the second tube section, wherein the second cradle is operable to support the rollator in cooperation with the first cradle;

a third tube section operable to engage the [second] *first* end of the first tube section, wherein the third tube section is operable to rotate about the longitudinal axis of the first tube section;

a fourth tube section affixed to the third tube section and operable to extend substantially perpendicularly from the third tube section, wherein the fourth tube section is affixed to the third tube section at or adjacent to a first end of the third tube section adjacent to a first end of the fourth tube section; and a clamp extending from the fourth tube section, wherein the clamp is operable to secure the rollator to the carrier by engaging the rollator and preventing the rollator from bouncing out of the first cradle and the second cradle while the rollator is being transported on the carrier; wherein:

the third tube section is rounded adjacent a second end of the third tube section opposite the first end of the third tube section and the third tube section is operable to fit within [or over] a portion of the first tube section such that a longitudinal axis of the third tube section is collinear with the longitudinal axis of the first tube section;

the first tube section has an alignment hole adjacent the first end of the first tube section;

the third tube section has a first hole operable to align with the alignment hole in the first tube section when the fourth tube section is substantially parallel to the second tube section; and the third tube section has a second hole operable to align with the alignment hole in the first tube section when the fourth tube section is substantially vertical and the carrier is in the substantially upright position.

2. The carrier of claim 1, further comprising an alignment pin tethered to the fourth tube section, said alignment pin operable to:

engage the alignment hole of the first tube section and the first hole of the third tube section to hold the fourth tube section substantially parallel to the second tube section; or engage the alignment hole of the first tube section and the second hole of the third tube section to hold the fourth tube section substantially vertical when the carrier is in the substantially upright position; and wherein the alignment hole is in a top of the first tube section.

3. The carrier of claim 1, further comprising an alignment pin operable to:

engage the alignment hole of the first tube section and the first hole of the third tube section to hold the fourth tube section substantially parallel to the second tube section; or engage the alignment hole of the first tube section and the second hole of the third tube section to hold the fourth tube section substantially vertical when the carrier is in the substantially upright position; and wherein the alignment hole is [in] *on* a [top] *lateral surface* of the first tube section, wherein the alignment pin is a spring loaded pin affixed to a lateral side of the first tube section.

4. The carrier of claim 1, wherein the first cradle and the second cradle each comprise a pair of protrusions extending generally upwardly from the second tube section when the second tube section is in an upright position for receiving the rollator.

5. The carrier of claim 1, wherein:

the mount is a vehicle receiver hitch;

the first tube section has a hitch pin hole adjacent the second end of the first tube section; and the first tube section is formed from square metal tubing.

6. The carrier of claim 1, wherein the second tube section is affixed to the first tube section by welding and the fourth tube section is affixed to the third tube section by welding.

7. The carrier of claim 1, wherein the second tube section comprises a single piece of tube.

8. The carrier of claim 1, wherein the second tube section comprises:

a first portion welded to the first tube section*; and* a second portion welded to the first tube section opposite the first portion.

9. The carrier of claim 1, wherein the clamp extends from a second end of the fourth tube section opposite the first end of the fourth tube section, and wherein the clamp comprises:

a hook having a first portion extending generally perpendicularly from the fourth tube section and a second portion extending generally parallel to the fourth tube section toward the first end of the fourth tube section;

a spring connected to the hook and connected to the fourth tube section, said spring biasing the hook into the second end of the fourth tube section; and a handle extending generally perpendicularly from the fourth tube section in a direction generally opposite the first portion of the hook.

10. A carrier operable to support and secure a rollator for transportation, said carrier comprising:

a first tube section having a first end and a second end opposite the first end, wherein the second end is operable to engage a mount, wherein the first tube section has a longitudinal axis extending along the first tube section from the first end to the second end;

a second tube section affixed to the first tube section adjacent the first end of the first tube section, wherein the first tube section is substantially centered with respect to the second tube section and the second tube section has a first end and a second end opposite the first end, wherein the second tube section is substantially horizontal when the carrier is in a substantially upright position;

a first cradle affixed to the second tube section at the first end of the second tube section or adjacent to the first end of the second tube section;

a second cradle affixed to the second tube section at the second end of the second tube section or adjacent to the second end of the second tube section, wherein the second cradle is operable to support the rollator in cooperation with the first cradle;

a third tube section operable to engage the [second] *first* end of the first tube section, wherein the third tube section is operable to rotate about the longitudinal axis of the first tube section;

a fourth tube section affixed to the third tube section and operable to extend substantially perpendicularly from the third tube section, wherein the fourth tube section is affixed to the third tube section at or adjacent to a first end of the third tube section adjacent to a first end of the fourth tube section; and a clamp extending from the fourth tube section, wherein the clamp is operable to secure the rollator to the carrier by engaging the rollator and preventing the rollator from bouncing out of the first cradle and the second cradle while the rollator is being transported on the carrier; wherein the clamp extends from a second end of the fourth tube section opposite the first end of the fourth tube section, and wherein the clamp comprises:

a hook having a first portion extending generally perpendicularly from the fourth tube section and a second portion extending generally parallel to the fourth tube section toward the first end of the fourth tube section;

a spring connected to the hook and connected to the fourth tube section, said spring biasing the hook into the second end of the fourth tube section; and a handle extending generally perpendicularly from the fourth tube section in a direction generally opposite the first portion of the hook.

11. The carrier of claim 10, wherein:

the third tube section is rounded adjacent a second end of the third tube section opposite the first end of the third tube section and the third tube section is operable to fit within [or over] a portion of the first tube section such that a longitudinal axis of the third tube section is collinear with the longitudinal axis of the first tube section;

the first tube section has an alignment hole adjacent the first end of the first tube section;

the third tube section has a first hole operable to align with the alignment hole in the first tube section when the fourth tube section is substantially parallel to the second tube section; and the third tube section has a second hole operable to align with the alignment hole in the first tube section when the fourth tube section is substantially vertical and *the* carrier is in the substantially upright position.

12. The carrier of claim 11, further comprising an alignment pin tethered to the fourth tube section, said alignment pin operable to:

engage the alignment hole of the first tube section and the first hole of the third tube section to hold the fourth tube section substantially parallel to the second tube section; or engage the alignment hole of the first tube section and the second hole of the third tube section to hold the fourth tube section substantially vertical when the carrier is in the substantially upright position; and wherein the alignment hole is in a top of the first tube section.

13. The carrier of claim 11, further comprising an alignment pin operable to:

engage the alignment hole of the first tube section and the first hole of the third tube section to hold the fourth tube section substantially parallel to the second tube section; or engage the alignment hole of the first tube section and the second hole of the third tube section to hold the fourth tube section substantially vertical when the carrier is in the substantially upright position; and wherein the alignment hole is [in] *on* a [top] *lateral surface* of the first tube section, wherein the alignment pin is a spring loaded pin affixed to a lateral side of the first tube section.

14. The carrier of claim 11, wherein the first cradle and the second cradle each comprise a pair of protrusions extending generally upwardly from the second tube section when the second tube section is in an upright position for receiving the rollator.

15. The carrier of claim 11, wherein:

the mount is a vehicle receiver hitch;

the first tube section has a hitch pin hole adjacent the second end of the first tube section; and the first tube section is formed from square metal tubing.

16. The carrier of claim 11, wherein the second tube section is affixed to the first tube section by welding and the fourth tube section is affixed to the third tube section by welding.

17. The carrier of claim 11, wherein the second tube section comprises a single piece of tube.

18. The carrier of claim 11, wherein the second tube section comprises:

a first portion welded to the first tube section a second portion welded to the first tube section opposite the first portion.

19. A carrier operable to support and secure a rollator for transportation, said carrier comprising:

a first tube section having a first end and a second end opposite the first end, wherein the second end is operable to engage a mount, wherein the first tube section has a longitudinal axis extending along the first tube section from the first end to the second end;

a second tube section affixed to the first tube section adjacent the first end of the first tube section, wherein the first tube section is substantially centered with respect to the second tube section and the second tube section has a first end and a second end opposite the first end, wherein the second tube section is substantially horizontal when the carrier is in a substantially upright position;

a first cradle affixed to the second tube section at the first end of the second tube section or adjacent to the first end of the second tube section;

a second cradle affixed to the second tube section at the second end of the second tube section or adjacent to the second end of the second tube section, wherein the second cradle is operable to support the rollator in cooperation with the first cradle;

a third tube section operable to engage the [second] *first* end of the first tube section, wherein the third tube section is operable to rotate about the longitudinal axis of the first tube section;

a fourth tube section affixed to the third tube section and operable to extend substantially perpendicularly from the third tube section, wherein the fourth tube section is affixed to the third tube section at or adjacent to a first end of the third tube section adjacent to a first end of the fourth tube section; and a clamp extending from the fourth tube section, wherein the clamp is operable to secure the rollator to the carrier by engaging the rollator and preventing the rollator from bouncing out of the first cradle and the second cradle while the rollator is being transported on the carrier; wherein the clamp extends from a second end of the fourth tube section opposite the first end of the fourth tube section, and wherein the [claim] *clamp* comprises:

a hook having a first portion extending generally perpendicularly from the fourth tube section and a second portion extending generally parallel to the fourth tube section toward the first end of the fourth tube section;

a spring connected to the hook and connected to the fourth tube section, said spring biasing the hook into the second end of the fourth tube section; and a handle extending generally perpendicularly from the fourth tube section in a direction generally opposite the first portion of the hook; wherein the third tube section is rounded adjacent a second end of the third tube section opposite the first end of the third tube section and the third tube section is operable to fit within [or over] a portion of the first tube section such that a longitudinal axis of the third tube section is collinear with the longitudinal axis of the first tube section;

the first tube section has an alignment hole adjacent the first end of the first tube section;

the third tube section has a first hole operable to align with the alignment hole in the first tube section when the fourth tube section is substantially parallel to the second tube section; and the third tube section has a second hole operable to align with the alignment hole in the first tube section when the fourth tube section is substantially vertical and *the* carrier is in the substantially upright position.

* * * * *